(12) United States Patent
Franklin

(10) Patent No.: US 10,627,019 B1
(45) Date of Patent: Apr. 21, 2020

(54) CABLE PROTECTOR SLEEVE

(71) Applicant: T-H Marine Supplies, LLC, Huntsville, AL (US)

(72) Inventor: Byron Franklin, Grant, AL (US)

(73) Assignee: T-H MARINE SUPPLIES, LLC, Huntsville, AL (US)

( * ) Notice: Subject to any disclaimer, the term of this patent is extended or adjusted under 35 U.S.C. 154(b) by 0 days.

(21) Appl. No.: 15/970,390

(22) Filed: May 3, 2018

Related U.S. Application Data

(60) Provisional application No. 62/503,895, filed on May 9, 2017.

(51) Int. Cl.
*F16L 5/08* (2006.01)
*F16L 7/02* (2006.01)
*B63H 20/00* (2006.01)

(52) U.S. Cl.
CPC .................. *F16L 5/08* (2013.01); *F16L 7/02* (2013.01); *B63H 21/265* (2013.01)

(58) Field of Classification Search
CPC ...................... F16L 5/08; F16L 7/02
See application file for complete search history.

(56) References Cited

U.S. PATENT DOCUMENTS

| | | | | |
|---|---|---|---|---|
| 3,941,159 A * | 3/1976 | Toll | ........................ | F16L 59/022 138/147 |
| 4,132,578 A * | 1/1979 | Gell, Jr. | .................. | B29C 65/18 156/158 |
| 4,237,584 A * | 12/1980 | Oetiker | .................... | F16J 3/042 24/20 CW |
| 4,281,211 A * | 7/1981 | Tatum | .................... | H01B 7/083 174/117 F |
| 4,478,437 A * | 10/1984 | Skinner | ..................... | F16L 5/10 24/20 EE |
| 5,178,923 A * | 1/1993 | Andrieu | ............. | A44B 18/0069 428/100 |
| 5,413,149 A * | 5/1995 | Ford | ........................ | D03D 3/02 138/123 |
| 5,901,756 A * | 5/1999 | Goodrich | ................ | F16L 3/233 138/110 |
| 6,102,076 A * | 8/2000 | Romero, Jr. | .......... | F01N 13/085 138/110 |
| 6,111,194 A * | 8/2000 | Kroulik | ................... | F16L 57/06 138/128 |

(Continued)

*Primary Examiner* — Robert Sandy
*Assistant Examiner* — David M Upchurch
(74) *Attorney, Agent, or Firm* — Jake M. Gipson; Stephen H. Hall; Bradley Arant Boult Cummings LLP

(57) ABSTRACT

An improved cable protector sleeve comprises a sheet of flexible material having a first longitudinal edge opposite of a second longitudinal edge, a first fastening means proximate to the first longitudinal edge, and a second fastening means proximate to the second longitudinal edge. The first and second fastening means, which may be hook-and-loop fasteners, are preferably disposed on opposite sides of the sheet. The sheet is secured around a plurality of cables by removably fastening the first fastening means to the second fastening means. Optionally, at least one friction means, such as a row of stitches, transverses the sheet and increases friction between the sheet and the plurality of cables. The improved cable protector is thus easily installed around and removed from a plurality of cables, providing protection and organization to the cables.

22 Claims, 3 Drawing Sheets

(56) References Cited

U.S. PATENT DOCUMENTS

| | | | | |
|---|---|---|---|---|
| 6,120,066 | A * | 9/2000 | Summach | F16L 7/00 |
| | | | | 285/149.1 |
| 6,309,721 | B1 * | 10/2001 | Gladfelter | B60R 13/08 |
| | | | | 428/298.1 |
| 6,701,580 | B1 * | 3/2004 | Bandyopadhyay | B65D 63/10 |
| | | | | 24/16 R |
| 6,822,166 | B2 * | 11/2004 | James | H02G 3/0487 |
| | | | | 174/93 |
| 8,127,405 | B2 * | 3/2012 | Barger | H02G 3/0481 |
| | | | | 24/16 R |
| 9,675,843 | B2 * | 6/2017 | Petty | A63B 29/028 |
| 2002/0098311 | A1 * | 7/2002 | Lindner | A44B 18/0092 |
| | | | | 428/40.1 |
| 2002/0170727 | A1 * | 11/2002 | Holland | H02G 15/18 |
| | | | | 174/19 |
| 2004/0255435 | A1 * | 12/2004 | Barger | F16L 3/233 |
| | | | | 24/306 |
| 2005/0098345 | A1 * | 5/2005 | Niehaus | H02G 3/0487 |
| | | | | 174/135 |
| 2007/0282240 | A1 * | 12/2007 | Hunter | A61F 5/0109 |
| | | | | 602/62 |
| 2012/0244767 | A1 * | 9/2012 | Senn | A45F 5/00 |
| | | | | 441/92 |
| 2015/0340128 | A1 * | 11/2015 | Lee | A44B 19/343 |
| | | | | 24/16 R |
| 2018/0092791 | A1 * | 4/2018 | Alper | A61H 1/008 |

* cited by examiner

CABLE PROTECTOR SLEEVE

CROSS REFERENCE TO RELATED APPLICATIONS

This application claims the benefit of and priority to U.S. Provisional Application No. 62/503,895, filed on May 9, 2017, and entitled "Troll Jacket," the disclosure of which is hereby expressly incorporated by reference in its entirety.

FIELD OF THE DISCLOSURE

The present disclosure relates to cable protectors, and more particularly to removable cable protectors for electric trolling motors and other devices commonly used on boats having cables and wires, like fish finders and gps devices.

BACKGROUND OF THE INVENTION

A common feature on fishing vessels is an electric trolling motor, which propels the vessel at low speeds while fishing. Electric trolling motors ordinarily include at least one set of power cables that connect the trolling motor to one or more onboard batteries. Many of these electric trolling motors are also foot operated (as opposed to hand operated). With foot operated trolling motors, a foot pedal is usually located on the floor of the vessel near the trolling motor. The foot pedal ordinarily has switches that control the direction and speed of the trolling motor, and it is usually connected to the trolling motor by mechanical cables or electrical cables. In many cases, the power cables and steering cables are bundled together in a plastic casing that extends from the foot pedal to the head of the trolling motor.

Once a trolling motor is installed on a vessel, a variety of accessories may be added to the vessel and trolling motor. For instance, a transducer may be installed on the motor housing so that, when the trolling motor is lowered into the water, the transducer can collect information like water depth and temperature. The transducer is ordinarily connected by one or more cables to an electronics unit that displays the relevant information. As another example, an electronic feeding stimulator, such as a Hydrowave®, may be installed on the motor housing. The stimulator is ordinarily connected by one or more cables to a control unit on the vessel. Both the control unit and the electronics unit (as well as other accessory units) are often located proximate to the trolling motor foot pedal.

When installing these various accessories on and around the trolling motor, users must carefully secure the numerous accessory cables so that the cables are protected and out of the way. In a common installation, a user secures the accessory cables using plastic zip ties. For instance, starting at the motor housing where a component of an accessory is installed (e.g. a transducer or feeding stimulator), the accessory cable may first be secured to the shaft of the trolling motor using a series of zip ties along the shaft. After reaching the head of the trolling motor, the accessory cable may then be secured to the plastic bundle of trolling motor cables using additional zip ties. From there, the accessory cable may or may not be secured to other structures on the vessel before it connects to the electronics unit, the control unit, or another device.

This arrangement-both the plastic case around the trolling motor cables and the accessory cables secured by zip ties to the plastic case—is less than ideal. The zip ties often cut into and damage the plastic case around the trolling motor cables. Additionally, even separate from the zip ties, a plastic case may wear out over time. Whatever the cause, the replacement of the plastic case can be difficult and time consuming. At one end of the cables, a user must disconnect each of the cables so that he can slide off the old plastic casing and slide on a new plastic casing. Particularly where the connections are difficult to reach or complex, this process can be frustrating.

The arrangement is also frustrating for other reasons. One reason is the effort involved when a user wants to replace or install components of accessories that are installed on the trolling motor. In that case, all zip ties must but cut (i.e. permanently destroyed) and a new set of zip ties must be installed after the replacement or installation is complete. Another reason is that the zip ties do not provide any protection to the accessory cables. The accessory cables are exposed to the weather and ultraviolet radiation, which over time can wear down the protective coatings and allow damage to occur to the cables. The accessory cables are also more susceptible to other sources of damage, such as fishing hooks or other sharp objects that may come into contact with the cables. And notably, the plastic case around the trolling motor cables provides only limited protection from these various factors.

Consequently, there is a need in the art for an improved cable protector sleeve and an improved method to secure and protect trolling motor cables and accessory cables that are commonly used with electric trolling motors. Preferably, the cable protector sleeve is easily installed on and easily removed from existing installations of trolling motors and accessories. The cable protector sleeve may also be resistant to weather, ultraviolet radiation, and other environmental factors, and it may provide some protection from abrasions and other external forces. Such an improved cable protector sleeve can also be used in connection with the cabling and wiring for other devices commonly used on boats having cables and wires, like fish finders and gps devices.

SUMMARY OF THE INVENTION

The present disclosure describes an improved cable protector sleeve and a method for protecting cables. Advantageously, the cable protector sleeve removably secures around a bundle of cables to provide protection and organization to the cables. The cable protector sleeve is preferably weather-resistant and UV-resistant, and it provides protection from various environmental factors and other hazards. Embodiments of the invention may thus satisfy one or more, but not necessarily all, of the needs and capabilities described throughout this disclosure.

In some embodiments, a cable protector sleeve is provided comprising a sheet of flexible material having a first longitudinal edge opposite of a second longitudinal edge, wherein the length of the sheet is at least twice as long as the width of the sheet; and a first fastening means secured proximate to the first longitudinal edge and a second fastening means secured proximate to the second longitudinal edge, wherein the first fastening means removably fastens to the second fastening means. The first fastening means may be a loop fastener, a plurality of male snap fasteners, a plurality of buttons, a row of zipper teeth, an adhesive surface, or any other suitable fastener. Optionally, the cable protector sleeve may further comprise at least one row of stitches transversing said sheet.

In some embodiments, a cable protector sleeve is provided comprising a sheet of neoprene having a first longitudinal edge opposite of a second longitudinal edge, wherein the length of the sheet is at least five times as long as the width of the sheet; a hook fastener secured to the top side of the sheet and proximate to the first longitudinal edge; and a loop fastener secured to the bottom side of the sheet and proximate to the second longitudinal edge.

In some embodiments, a method for protecting cables is provided comprising providing an embodiment of the cable protector sleeve; bundling a plurality of cables together, wherein at least one of the plurality of cables is secured at each end of the cable; wrapping the cable protector sleeve around the bundle of cables; and fastening the first fastening means to the second fastening means, wherein the wrapping and fastening steps are performed without unsecuring the at least one secured cable.

The above summary presents a simplified summary to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DEFINITIONS

Figure 1:
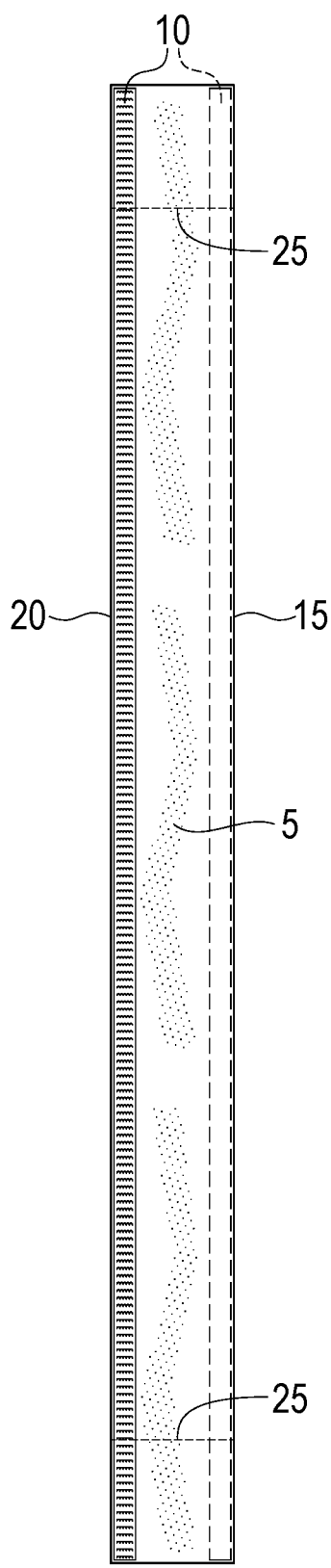
FIG. 1: A top view of one embodiment of the cable protector sleeve.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an," and "the" are intended to include the plural forms as well, unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure. Likewise, the terms "top" and "bottom" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

An improved cable protector sleeve and method for protecting cables have been developed and are described herein. The cable protector sleeve and method are particularly advantageous for electric trolling motors, especially foot operated ones. The teachings herein, however, are not limited to such applications. Embodiments of the cable protector sleeve may be advantageous for numerous applications where it is desirable to protect one or more cables or similar structures, particularly in situations where the cables cannot be easily disconnected. The cables may be mechanical or electrical cables, and similar structures would include fluid hoses or shafts. For instance, embodiments of the cable protector sleeve may be used to protect accessory cables running along the trolling motor shaft by encasing the shaft and cables, or to protect other cables on a vessel (such as the cables connecting the throttle, steering, and other mechanisms on the vessel to the combustion motor).

Figure 2:
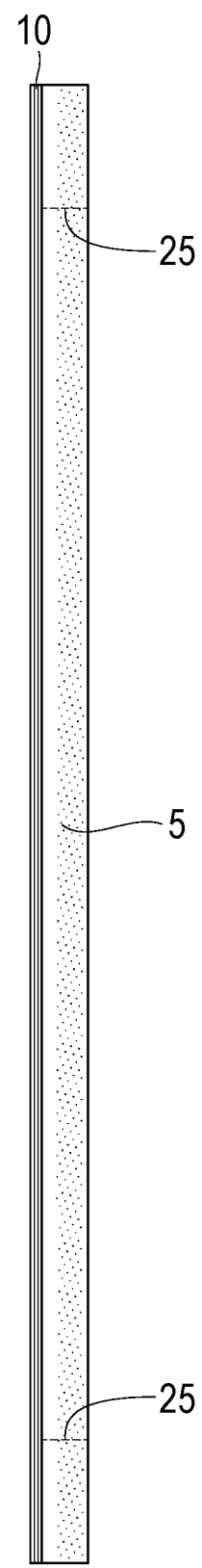
FIG. 2: A top view of one embodiment of the cable protector sleeve with the hook and loop fasteners fastened to each other.
Figure 3:
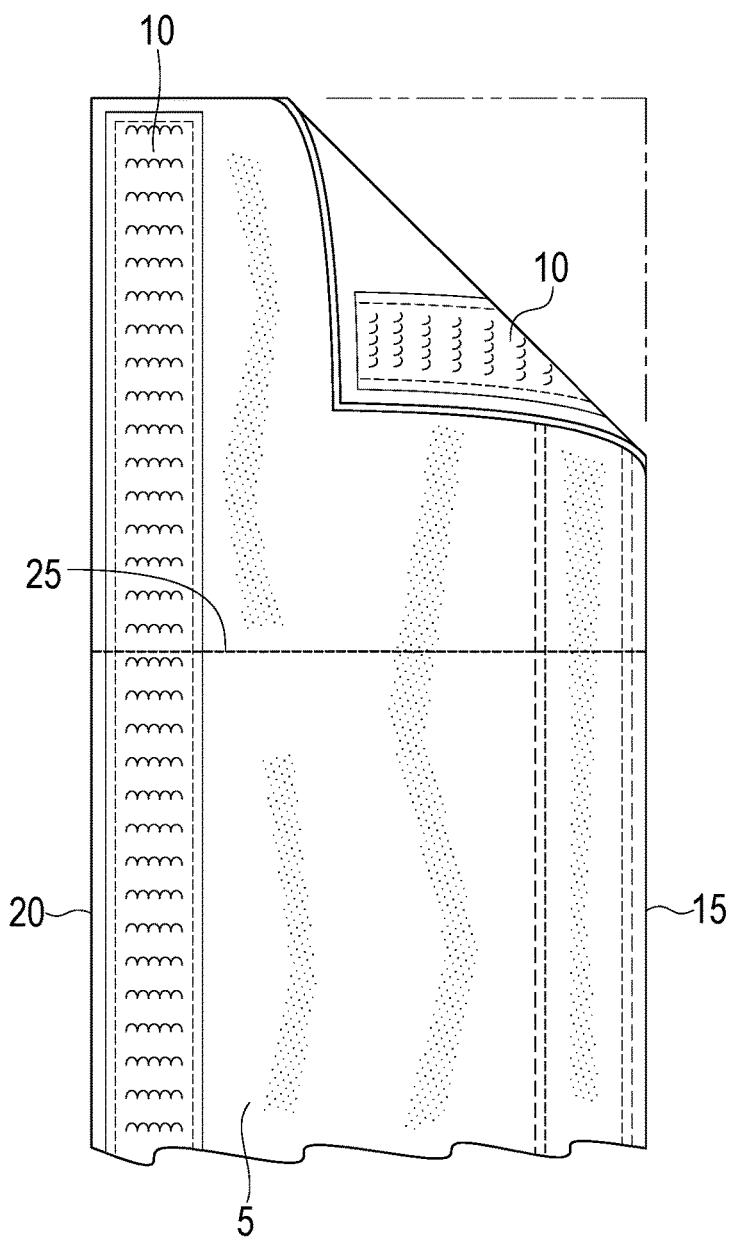
FIG. 3: An enhanced top view of one end of an embodiment of the cable protector sleeve.
Figure 4:
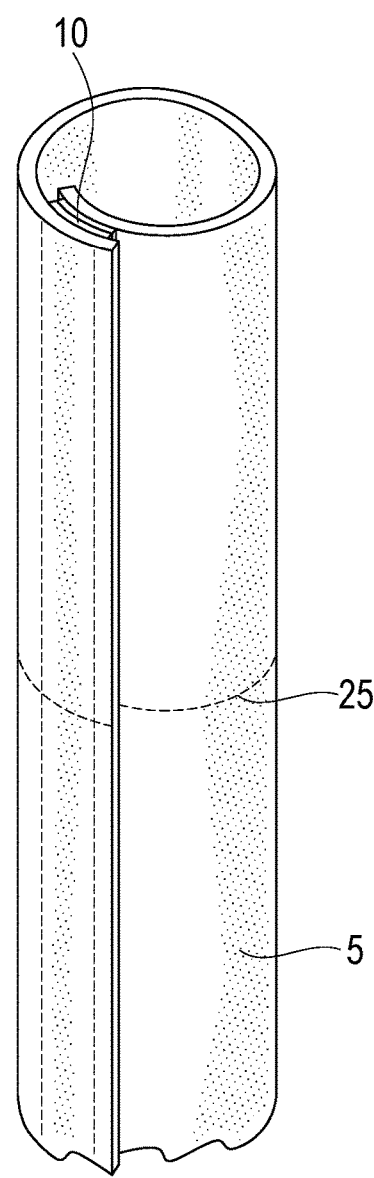
FIG. 4: An enhanced perspective view of one end of an embodiment of the cable protector sleeve with the hook and loop fasteners fastened to each other.

An embodiment of the cable protector sleeve is shown in FIGS. 1-4. In this embodiment, the cable protector sleeve comprises a rectangular sheet of neoprene 5, a hook fastener 10 secured proximate to one of the longitudinal edges 20 of the sheet 5, and a loop fastener 10 secured proximate to the opposite longitudinal edge 15. The width of the loop fastener 10 is preferably between about 0.5 inches (approx. 1.3 centimeters) and about 1.5 inches (approx. 3.8 centimeters), and more preferably about 1 inches (approx. 2.5 centimeters). The hook fastener 10 may preferably have a width in the same range as well. The width of the loop fastener and the hook fastener 10 allows the cable protector sleeve 5 to be snugly secured around cable bundles of different sizes. The fasteners 10 are preferably secured to opposite sides of the sheet 5—one on the top side and the other on the bottom side-so that, when the hook and loop fasteners 10 are secured to each other, the sheet 5 is rolled up as shown in FIGS. 2 and 4. Numerous variations of this embodiment are possible, which are further described below.

The sheet 5 is preferably constructed from a flexible material. In a preferred embodiment, the sheet 5 is constructed from neoprene having a thickness between about 1.5 and about 2.5 millimeters, and preferably about 2 millimeters. Other thicknesses of neoprene, both smaller and greater, may also be used. Neoprene is advantageous because the material is flexible and durable. The flexibility of neoprene allows the cable protector sleeve to conform to the shape of the cables. And the durability of neoprene, which can withstand long-term exposure to various weather conditions like heat, cold, rain, and wind, allows the sleeve to be weather-resistant. The neoprene may also be resistant to ultraviolet radiation. Advantageously, neoprene is also stretchable, which allows the cable protector sleeve to be wrapped snuggly around the cable. Additionally, neoprene having some thickness (such as the 2 millimeter thickness in some embodiments) provides padding that helps to protect the cables from impacts and abrasions.

Of course, the sheet 5 may be constructed from other materials as well. Preferably, such materials are also flexible. For example, various other elastomers, such as natural or synthetic rubbers, or a rubberized material (a textile or other material coated in a flexible, stretchable polymer) may be suitable. More preferably, the material is also weather-resistant, meaning that the material is durable and resists degradation despite long-term exposure to the weather (e.g. the sun, wind, rain, snow, heat, cold, etc.). Preferably, the material is weather-resistant such that it can withstand two or more years of cumulative exposure to the outdoors without degradation that significantly impairs the function or appearance of the material. The material may also preferably be UV-resistant, which is often measured in terms of the material's Ultraviolet Protection Factor (UPF). In some embodiments, the material has a UPF of at least 15, more preferably of at least 30, and even more preferably of at least 50. In some embodiments, one side of the sheet 5 may include at least one indicia or logo.

The sheet 5 preferably has a shape that is substantially rectangular. As shown in FIG. 1, the width of the sheet 5 (which is measured as the distance between the longitudinal edges 15, 20) is substantially shorter than the length of the sheet 5. Preferably, the length is at least twice as long as the width, more preferable at least five times as long as the width, and even more preferably at least ten times as long as the width. In a specific preferred embodiment, the sheet 5 is approximately 60 inches (approx. 152 centimeters) in length and approximately 5 inches (approx. 13 centimeters) in width. In that embodiment, when the sheet 5 is rolled together as shown in FIGS. 2 and 4, the sheet has a cross section with diameter of approximately 1.5 inches (approx. 4 centimeters). More generally, the sheet 5 may be dimensioned for a particular application. That is, the length is preferably selected to correspond to length of protection intended for the cables, and the sheet 5 preferably has width that is slightly greater than the circumference of the cables or bundle of cables.

In some embodiments, the shape of the sheet 5 may vary from rectangular. This shape may be desirable where, for instance, the cables that are to be protected have a wider diameter at one end. For example, the cables may be wider because of connectors installed on the end of the cables. To accommodate different diameters, the sheet 5 may be wider at one end than at the other end, or wider at both ends. Thus, the sheet 5 is substantially rectangular throughout the majority of its length, but near the wider end, the longitudinal edges 15, 20 flare outward. For example, in an embodiment having a length of 60 inches and a base width of 5 inches, the first few inches along the length (for example, the first 1-3 inches) and the last few inches along the length (for example, the last 1-3 inches) may flare from a width of 5 inches to 6-8 inches at the very ends of the sheet 5. This shape therefore allows the sheet 5 to accommodate and wrap around a bundle of cables and/or cable connectors having a wider diameter at one end.

The sheet 5 may also include other features to accommodate the cables of a specific installation. For instance, some installations may include a cable that could benefit from protection even though the cable does not run the entire length of the bundle of cables. In that instance, the sheet 5 may include one or more through holes in the sheet. When the cable protector sleeve is installed, a cable that does not run the length of the sleeve may be inserted into the through hole so that it is protected for a certain length of the sleeve until the cable reaches a point at which it deviates from the other cables in the sleeve. Of course, where a sheet 5 comprises a material like neoprene, a user may easily add one or more through holes by simply cutting the neoprene at the desired location.

The protector sleeve includes a first and second fastening means 10. The first fastening means is secured proximate to one longitudinal edge 20 of the sheet 5, and the second fastening means 10 is secured proximate to the opposite longitudinal edge 15. In a preferred embodiment, the first and second fastening means 10 are hook-and-loop fasteners (e.g. Velcro), with one of the means comprising the hook fastener and the other means comprising the loop fastener. Advantageously, the hook-and-loop fasteners allow the cable protector sleeve to be both easily installed around and easily removed from the cables. As shown in FIG. 3, in some embodiments, one of the fastening means 10 is installed on the top side of the sheet 5, and the other fastening means 10 is installed on the bottom side of the sheet 5. As a result of this configuration, the longitudinal edges of the sheet 5 must be overlapped to connect the fastening means to each other.

This configuration allows the sheet 5 to be secured tightly around cables. This configuration also allows the cable protector sleeve to be adapted to cables of varying diameter. So long as the hook-and-loop fasteners overlap enough to secure the sleeve, the amount of overlap of the longitudinal edges may be increased or decreased to accommodate variations in the circumferences of the bundle of cables. The hook-and-loop fasteners also provide an alternative to including through holes in the sheet 5. Specifically, if a cable does not extend through the entire length of the bundle and protector sleeve, the cable may protrude out of the sleeve by passing in between the hook and loop fasteners. In many cases, the cable protector sleeve would remain sufficiently secure around the bundle of cables even though the portion of the fasteners around the protruding cable would not be fastened together.

Of course, other fastening means 10 may be used instead of hook and loop fasteners. For instance, the fasteners may be replaced by a plurality of snap fasteners located along the longitudinal edges 15, 20. Ordinarily, a plurality of male snap fasteners is secured along one of the longitudinal edges 15, and a complementing plurality of female snap fasteners is secured along the other longitudinal edge 20. As with the hook-and-loop fasteners shown in FIG. 3, the male fasteners may be installed on the top side of the sheet 5, while the female fasteners may be installed on the bottom side, or vice versa. In some embodiments, two or more rows of fasteners may be provided along the length to enable the fasteners to be secured in a way that accommodates varying diameters of cables or cable bundles, e.g., one row that would provide an inside diameter of 1 inch and another row that would provide an inside diameter of 1.5 inches, etc. Similarly, the first and second fastening means may be a plurality of buttons and button holes, which may be located proximate to the longitudinal edges 15, 20 in a fashion similar to the hook-and-loop or the snap fasteners. In a similar convention, two or more rows of buttons or button holes can be provided along the length to provide varying inside diameters when secured. The first and second fastening means may also comprise two adhesive surfaces, which may be joined by an adhesive. Any adhesive suitable for use with the material comprising the sheet 5 may be used, and preferably the adhesive is non-permanent so that the adhesive surfaces may be separated without destroying the sheet 5.

As yet another alternative, the first and second fastening means 10 may comprise a first and second row of matching zipper teeth, which may be connected by a slider. In this embodiment, the zipper teeth may be attached to the longitudinal edges 15, 20, in which case the longitudinal edges do not overlap when the zipper is secured together. Or in other embodiments, one of the rows of teeth may be installed on the top or bottom side of the sheet 5 proximate to one longitudinal edge, with the other row of teeth attached to the opposite longitudinal edge. In that case, when the zipper is connected, the longitudinal edges 10, 15 would overlap similar to the previously discussed embodiments using fastener means.

Advantageously, the width of the sheet 5 and the location of the fastening means 10 may be configured so that the sheet may or must be stretched to secure the sleeve around the cable or bundle of cables. When the sheet 5 is fastened in a stretched (or tensioned) state, the sheet 5 exhibits a compressive force around the cables. That compressive force increases the amount of friction between the cables and the sleeve, which may be desirable because the increased friction reduces the likelihood that the sleeve will slide along the cables.

Optionally, the cable protector sleeve may further comprise at least one means for increasing friction between the sleeve and the protected cables. Depending on the installation, the friction means may be advantageous where a cable protector sleeve, even if fastened with some tension around the cables, slides along the cables easier than desired. Consequently, the cable protector sleeve may become mis-positioned and provide less protection than desired. To address this concern, various friction means may be used to increase the amount of friction between the cable protector sleeve and the bundle of cables. Due to the increased friction between the cable protector sleeve and the bundle of cables, the sleeve is less likely to slide or to become mis-positioned.

In some embodiments, the friction means transverses the sheet 5. For example, the friction means may comprise at least one row of stitches 25 transversing the sheet 5, as shown in FIGS. 3 and 4. Because the material used for stitches ordinarily has less stretch than the material comprising the sheet 5, when the row of stitches 25 is stretched to wrap around the cables, the row of stitches 25 exerts a greater compressive force around the cables than does the material of the sheet 5. As a result, increased friction exists between the row of stitches 25 and the cables, which decreases the likelihood that sleeve will slide along the cables. In a preferred embodiment, the cable protector sleeve comprises a first row stitches 25 located near one end of the sheet. Preferably, the first row of stitches 25 is located at a distance from the end of the sheet that is approximately equal to the width of the sheet. That is, if the sheet is approximately 5 inches (approx. 13 centimeters) in width, the first row of stitches 25 is located approximately 5 inches (approx. 13 centimeters) from one end. More preferably, the sleeve may further comprise a second row of stitches 25 that is similarly located near the opposite end of the sheet 5. Such an embodiment is shown in FIGS. 1 and 2. While two rows of stitches 25 are shown, any number of rows of stitches 25 can be used, including 3 or more.

Various alternatives to the row of stitches 25 may be used as well. For instance, a strip of material having a high friction surface (e.g. a rough surface or sticky surface) may transverse the sheet 5. Similar to the row of stitches 25, the strip of material having a high friction surface will exhibit greater friction between itself and the cables, thus decreasing the likelihood that the sleeve will slide along the cables.

Figure 5:
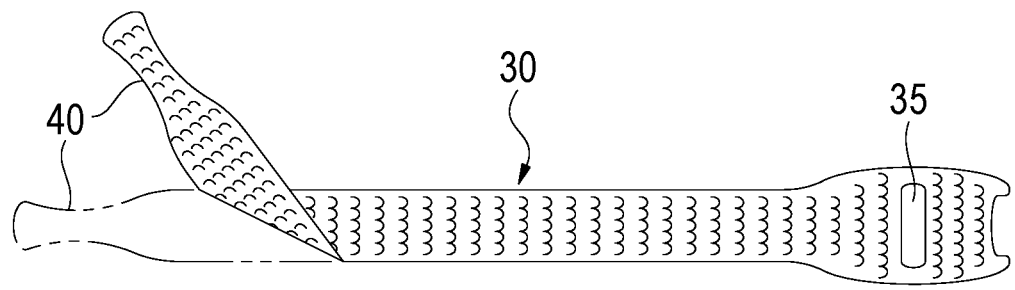
FIG. 5: A top view of one embodiment of a tie used in some embodiments of the cable protector sleeve.
Figure 6:
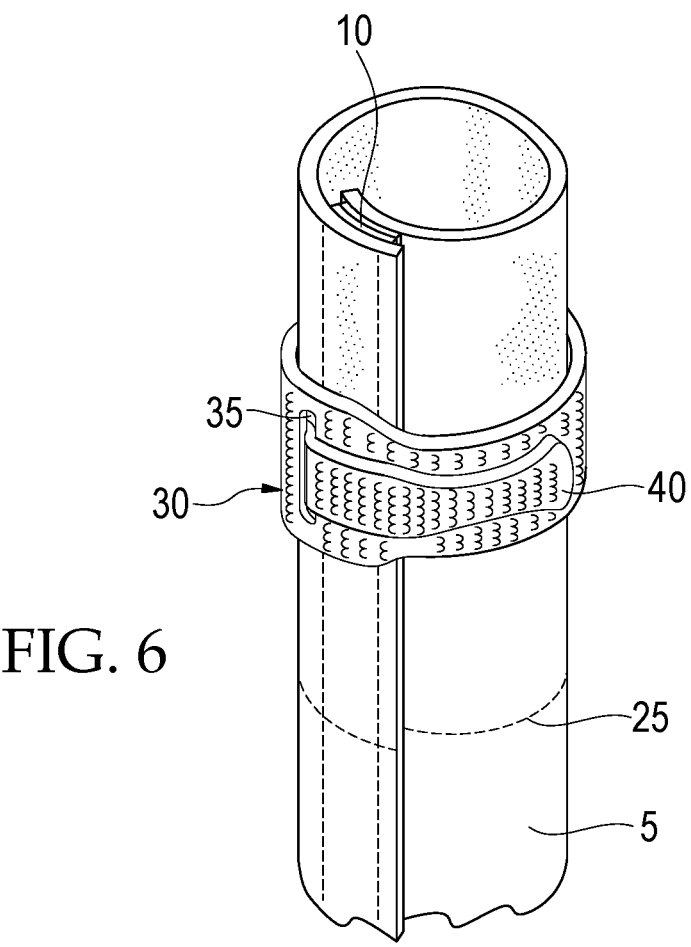
FIG. 6: An enhanced perspective view of one end of an embodiment of the cable protector sleeve with an embodiment of a tie fastened around the sleeve.

In other embodiments, however, the friction means is a component that wraps around the cable protector sleeve after it is installed around the cable or bundles of cable. One example of such a friction means is the tie 30 illustrated in FIGS. 5 and 6. As shown, the tie 30 comprises an elongated strip of Velcro, with one side having the hook fasteners and the other side having the loop fasteners. One end of the elongated strip includes a loop 35, and the other, narrower end 40 is dimensioned to pass through the loop 35. After the cable protector sleeve has been installed around cables, the tie 30 may be installed around the cable protector sleeve. As shown in FIG. 6, the tie 30 is installed by wrapping the tie 30 around the sleeve and inserting the narrow end 40 into the loop 35. Once the tie 30 is tightened to a desired amount, the tie 30 is secured by pressing the overlapping top and bottom surfaces together, which fastens the hook fastener of one surface to the loop fastener of the other surface. Assuming that the tie 30 is tightened with some force around the sleeve, the tie 30 supplies a compressive force, which increases the amount of friction between the sleeve and cables. The tie 30 therefore reduces the likelihood that the sleeve will slide along the cables.

Of course, numerous other ties or friction means may be employed as well. For instance, the tie may be a twist tie, which is secured by wrapping the tie around the sleeve and twisting the ends together. Likewise, the tie may be secured by other fastening means. For instance, the tie may include one or more snap fasteners or buttons that secure the tie around the sleeve. Likewise, the friction means may alternatively be a strap and a buckle. The strap may be wrapped around the sleeve and then secured by the buckle. Optionally, any of the foregoing ties or other friction means may be attached or unattached to the sheet 5.

A method is now described for protecting a plurality of cables. Advantageously, the following method may be used in connection with cables that are already secured at each end of their ends, making a traditional protector sleeve difficult to apply because it would require disconnecting at least one end of the secured cable so that the sleeve could be slid onto the cable. Thus, the following method saves users significant time and effort in protecting a plurality of cables.

The method begins with providing one of the cable protector sleeves described in this disclosure. The cable protector sleeve may be any of the embodiments discussed above, and it preferably has dimensions that are well-matched to the dimensions of the plurality of cables needing protection.

The plurality of cables are bundled together. Here, the cables are collected together so that the cable protector sleeve may be more easily applied to the cables. Thus, the cables need not be tightly bound together at this stage but rather loosely grouped with one another. Where the cables are being installed around a shaft or another structure, the plurality of cables may be bundled around the structure.

The cable protector sleeve is then applied to the bundle of cables by wrapping the sleeve around the bundled cables. As discussed above, this step may include stretching the sleeve so that the material is under tension and applies a compressive force around the bundle of cables. Advantageously, the compressive force helps keep the bundle together and allows the sleeve to resist sliding along the cables. Where the plurality of cables is bundled around a shaft or another structure, the shaft or other structure is likewise wrapped with the cable protector sleeve.

Once the sleeve is wrapped around the bundle of cables, the fastening means of the sleeve may be fastened. To the extent that is desirable to keep the sleeve stretched around the cables, the fasteners may be fastened to keep the material in tension. Once the fasteners are secured, the cable protector sleeve is installed. Notably, the installation has been accomplished without the need to disconnect or unsecure any of the cables in the bundle.

Optionally, the method for protecting cables may further comprise steps to easily remove the cable protector sleeve. This embodiment of the method comprises first unfastening the fastening means of the cable protector sleeve. The sleeve may then be removed by unwrapping the sleeve from the bundle of cables. Like with the installation of the cable protector sleeve, the removal of the sleeve is accomplished without the need to disconnect or unsecure any of the bundled cables.

As a further option, the method may be employed in instances where at least one cable is unsecured at one end and is not part of the bundle for the entire length of the protector. In this embodiment of the method, the cable protector sleeve comprises at least one through hole in the sheet 5. Before the fastening step, the method therefore comprises inserting the unsecured end of the at least one cable into the through hole. Thereafter, the fasteners of the cable protector sleeve may be secured in place.

For an additional option, the method may include attaching one or more friction means to the sleeve. In an exemplary embodiment, the method comprises providing at least one friction means, such as the tie 30 disclosed herein. After the sleeve has been fastened around the bundled cables, the method further comprises wrapping the friction means around the sleeve and then fastening the fasteners of the friction means, thus securing the friction means around the sleeve. As discussed above, this method advantageously increases the amount friction between the sleeve and bundled cables, which decreases the likelihood that the sleeve will slide along the bundled cables.

While the invention has been described with respect to a limited number of embodiments, those skilled in the art, having benefit of this disclosure, will appreciate that other embodiments can be devised which do not depart from the scope of the invention as disclosed here.

I claim:

1. A cable protector sleeve for protecting cables comprising:
    a sheet of elastic, flexible material having a first longitudinal edge opposite of a second longitudinal edge, wherein the length of said sheet is at least twice as long as a first width of said sheet; and
    a first fastening means proximate to said first longitudinal edge and a second fastening means proximate to said second longitudinal edge, wherein said first fastening means removably fastens to said second fastening means,
    wherein the sheet of elastic, flexible material is stretchable to a second width and configured such that, when the sheet of elastic, flexible material is stretched to said second width around said cables and the first fastening means is attached to the second fastening means, the sheet of elastic, flexible material exhibits a compressive force to said cables.

2. The cable protector sleeve of claim 1, wherein the length of said sheet is at least five times as long as the width of said sheet.

3. The cable protector sleeve of claim 2, wherein the length of said sheet is at least ten times as long as the width of said sheet.

4. The cable protector sleeve of claim 1, wherein said first fastening means is secured to one side of said sheet and said second fastening means is secured to the opposite side of said sheet.

5. The cable protector sleeve of claim 4, wherein said first fastening means is a hook fastener and said second fastening means is a loop fastener.

6. The cable protector sleeve of claim 1, wherein said first fastening means is a hook fastener and said second fastening means is a loop fastener.

7. The cable protector sleeve of claim 1, wherein said material comprises an elastomer.

8. The cable protector sleeve of claim 1, wherein said material comprises neoprene.

9. The cable protector sleeve of claim 8, wherein the thickness of said neoprene is between about 1.5 and about 2.5 millimeters.

10. The cable protector sleeve of claim 1, wherein said sheet has a substantially rectangular shape.

11. The cable protector sleeve of claim 10, said sheet further comprising a first end opposite a second end, wherein said first end is wider than said second end.

12. The cable protector sleeve of claim 1 further comprising at least one friction means extending transversely across said sheet and positioned on a first side of the sheet configured to contact the cables.

13. The cable protector sleeve of claim 12, wherein said at least one friction means is at least one row of stitches transversing said sheet.

14. The cable protector sleeve of claim 13, wherein the distance from an end of said sheet to said at least one row of stitches is approximately equal to the width of said sheet.

15. The cable protector sleeve of claim 1, wherein said sheet has at least one through hole.

16. The cable protector sleeve of claim 1, further comprising at least one friction means having a fastener, wherein said friction means is securable around said sheet by said fastener when said first and second fastening means are fastened.

17. A cable protector sleeve for protecting cables comprising:
- a sheet of elastic neoprene having a first longitudinal edge opposite of a second longitudinal edge, wherein the length of said sheet is at least five times as long as a first width of said sheet; and
- a hook fastener secured to one side of said sheet and proximate to said first longitudinal edge, and a loop fastener secured to the opposite side of said sheet and proximate to said second longitudinal edge,
- wherein the sheet of elastic neoprene is stretchable to a second width and configured such that, when the sheet of elastic neoprene is stretched to said second width around said cables and the hook fastener is attached to the loop fastener, the sheet of elastic neoprene exhibits a compressive force to said cables.

18. The cable protector sleeve of claim 17 further comprising:
- a first row of stitches transversing said sheet, wherein the distance from a first end of said sheet to said first row of stitches is approximately equal to the width of said sheet; and
- a second row of stitches transversing said sheet, wherein the distance from a second end of said sheet to said second row of stitches is approximately equal to the width of said sheet.

19. A method for protecting cables comprising:
providing the cable protector sleeve of claim 1;
bundling a plurality of cables together, wherein at least one of said plurality of cables is secured at both ends of said cable;
stretching the sheet of elastic, flexible material to the second width;
wrapping said cable protector sleeve around said bundle of cables; and
fastening said first fastening means to said second fastening means,
wherein said wrapping and fastening steps are performed without unsecuring either end of said at least one secured cable.

20. The method of claim 19, further comprising:
unfastening said first fastening means from said second fastening means; and
removing said cable protector sleeve from said bundle of cables,
wherein said removing step is performed without unsecuring either end of said at least one secured cable.

21. The method of claim 19, wherein at least one of said plurality of cables is unsecured at one end of said cable, and wherein said sheet has at least one through hole, the method further comprising:
inserting, before said fastening step, said unsecured end of said at least one unsecured cable into the said through hole.

22. The method of claim 19, further comprising:
providing at least one friction means having a fastener, wherein said friction means is securable around said sheet by said fastener when said first and second fastening means are fastened;
wrapping, after said fastening step, said friction means around said cable protector sleeve; and
securing said fastener of said friction means.

* * * * *